Sept. 11, 1923.

A. E. ROPE

VALVE

Filed Aug. 20, 1921

WITNESSES
Edw. Thorpe
S. W. Foster

INVENTOR
Arthur E. Rope
BY
Munn & Co.
ATTORNEYS

Sept. 11, 1923.

A. E. ROPE 1,467,816

VALVE

Filed Aug. 20, 1921

WITNESSES
Edw. Thorpe
S. W. Foster

INVENTOR
Arthur E. Rope
BY
Munn & Co
ATTORNEYS

Patented Sept. 11, 1923.

1,467,816

UNITED STATES PATENT OFFICE.

ARTHUR E. ROPE, OF BROOKLYN, NEW YORK.

VALVE.

Application filed August 20, 1921. Serial No. 493,812.

*To all whom it may concern:*

Be it known that I, ARTHUR E. ROPE, a citizen of the United States, and a resident of the city of New York, borough of Brooklyn, in the county of Kings and State of New York, have invented a new and Improved Valve, of which the following is a full, clear, and exact description.

This invention relates to improvements in valves, an object of the invention being to provide a valve having a turning movement and a longitudinal movement imparted by screw threaded engagement between the valve and the casing whereby the valve is caused to tightly seat and form a water, air or steamtight juncture with its seat under any pressure.

A further object is to provide an improved construction of valve and seat, the valve being of segmental form and permitted a half turn in the valve casing whereby the valve operates either to open or close a port through the seat and insure a tight closure when the valve is in closed position.

A further object is to provide an improved valve which may be utilized as a faucet or as a valve controlling the flow between sections of pipe and adapted for use either in connection with a flow longitudinally through the valve or at right angles thereto, and in all positions of operation will function with equal success.

A further object is to provide a valve of the character stated which can be manufactured and sold at a reasonably low price and which will most efficiently perform the functions for which it is intended.

With these and other objects in view the invention consists in certain novel features of construction, and combinations and arrangements of parts as will be more fully hereinafter described and pointed out in the claims.

In the accompanying drawings—

Figure 1:
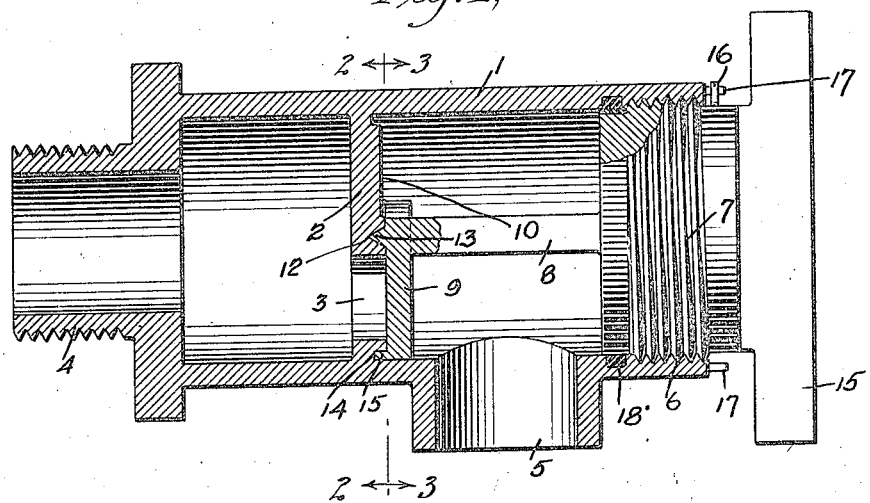
Figure 1 is a view in longitudinal section partly in elevation illustrating one form of my improved valve, which form can be utilized as a faucet.
Figures 2, 3:
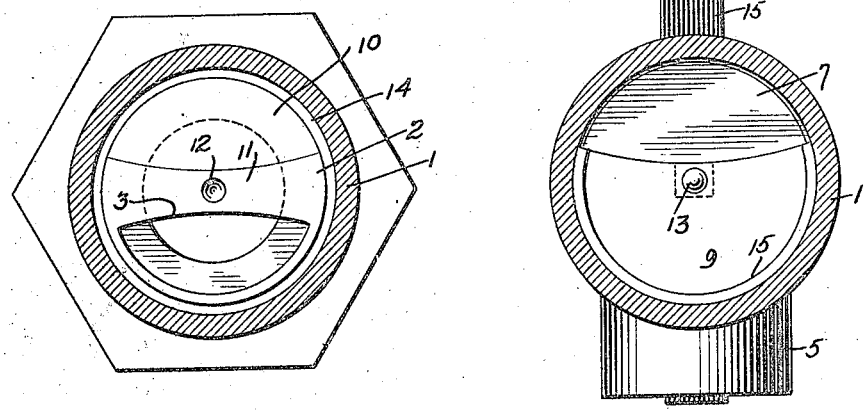
Figure 2 is a view in transverse section on the line 2—2 of Figure 1, the elements of the valve being removed for purposes of clearness in illustrating the structure of the valve seat.
Figure 3 is a view in transverse section on the line 3—3 of Figure 1, the valve being shown in end elevation.

Referring now more particularly to Figures 1, 2 and 3, 1 represents the casing of my improved valve which is of general cylindrical form having a transverse partition 2 therein, the latter provided with an opening or port 3 for passage of the fluid. This valve casing 1 is formed at one end with a nipple 4 for connection with a supply pipe and in its side, preferably in its lower side is made with an outlet spout 5, the partition 2 being located between the nipple 4 and the spout 5, as will be readily understood. The form of valve shown in Figures 1, 2 and 3 is especially adapted for use as a faucet, but it is obvious that it may be used as a pipe coupling for pipe connection to control the flow in the line, if desired.

The outer end of the casing 1 is internally screw threaded, as shown at 6, to receive the enlarged, screw threaded, outer end 7 of a stem 8 of my improved valve 9.

The valve 9 is of segmental form and comprises slightly more than half of the circle and has a ground joint or smooth bearing against the valve seat 2. In order to reduce friction to a minimum, the valve engaging face of the seat 2 is recessed or offset, as shown at 10, so that the valve has a ground joint only against a relatively small intermediate portion 11 of said seat. The seat 2 is made with a central socket 12 receiving a stud 13 on the valve and said seat 2 is made at its outer edge with a circular groove 14 in which a flange 15 at the edge of valve 9 is moved.

The enlarged outer end 7 of the stem 8 is made with any approved form of handle 15 and a pin 16 on the enlarged end 7 is adapted to engage either of two pins 17 on the end of the casing 1 to limit the turning movement of the valve so that the valve can be given only a half turn in either direction. These pins are properly positioned after the valve has been adjusted to its seat.

To prevent leakage, I provide any suitable form of packing 18', preferably at the inner end of the valve stem enlargement 7 and in the casing 1, as clearly shown in Figure 1, but it is obvious that other forms of packing might be employed without departing from the invention.

The operation of my improved valve is as follows: Figure 1 illustrates the valve in closed position. To open the valve the stem 8 is given a one-half turn by manual operation of the handle 15 and in this movement of the valve, the screw threaded portion 7 causes the valve to move longitudinally away from its seat a distance of one-half thread so that friction is reduced and the valve quickly swung to open position. With the reverse movement of the valve, the threads compel a longitudinal movement toward the seat as well as a partial rotary movement of the valve, so that the valve has a grinding action against the seat insuring a snug air, steam, or watertight juncture. The valve 9 is preferably slightly more than a half circle so that a certain amount of variation or wear is permitted without interfering with the perfect operation of the valve, and by reason of the longitudinal and turning movement of the valve, a clean seat is insured and compensation for wear is had.

Figure 4:
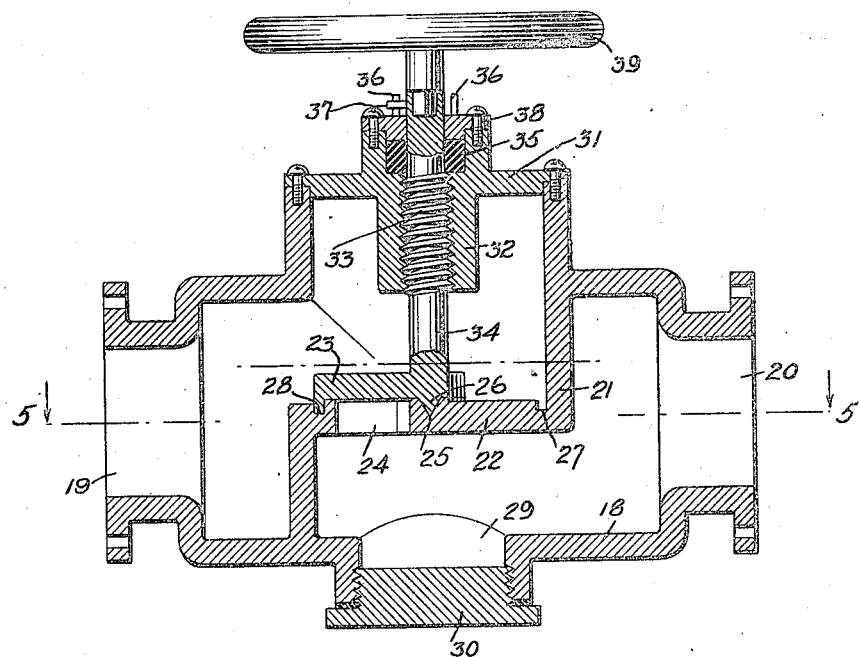
Figure 4 is a view in longitudinal section illustrating a modified form of my improved valve.
Figure 5:
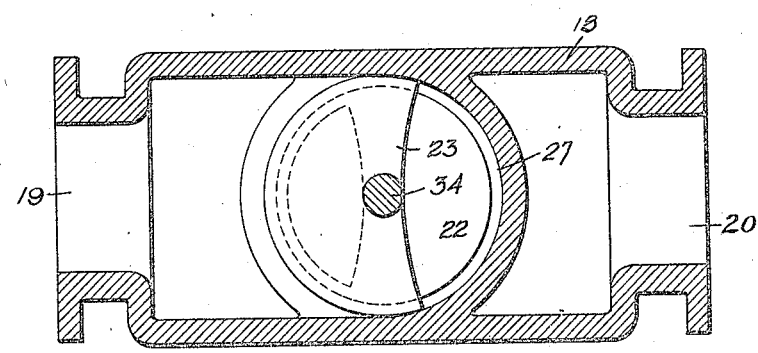
Figure 5 is a view in longitudinal section at right angles to Figure 4 taken on the line 5—5 of Figure 4.

In the modification illustrated in Figures 4 and 5, I illustrate my invention in connection with a valve somewhat resembling the well-known globe type of valve with the valve stem at right angles to the valve casing.

Referring to Figures 4 and 5, 18 represents the valve casing having an inlet 19 at one end and an outlet 20 at its other end separated by a partition 21. The intermediate portion of this partition, which is located longitudinally of the valve casing, constitutes a valve seat 22 which is, in all structural respects, similar to the valve seat 2 of Figure 1, and against this valve seat 22 a valve 23 normally engages and is similar in all respects to the valve 9 shown in Figure 1. In other words, the seat 22 has an opening or port 24 therein, a central socket 25 receiving the stud 26 of valve 23 and the seat 22 is made with a groove 27 receiving the flange 28 of the valve. Below the seat 22 the casing 18 is formed with an opening 29 normally closed by a plug 30 and this opening may constitute a clean-out port or permit observation of the valve or be used as a point of coupling for a pipe as may be desired.

A removable cap 31 is secured on casing 18 and has a central internally screw threaded portion 32 receiving the threaded portion 33 of valve stem 34. This cap 31 may have any suitable stuffing box 35 to render the valve stem air, steam and liquid tight, and pins 36 and 37 on the stuffing box cover 38 of valve stem 34 respectively limit the turning movement of the stem so as to permit but a half turn of the valve for the purpose above stated in connection with the description of Figure 1. A removable handle 39 is connected to the stem in any approved manner to facilitate the turning of the valve. The operation of this form of valve shown in Figures 4 and 5 is precisely like that of the preferred form; namely, a half turning movement imparted to the stem 34 will cause the valve 23 to turn half-way around and also be given a longitudinal movement so as to release from the seat in opening, and force against the seat in closing, and insuring a tight ground joint.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A valve of the character described, comprising a casing, a partition in the casing constituting a valve seat and having a port therein, a segmental valve in the casing adapted to engage the valve seat, a stem on the valve having screw threaded engagement with the casing, whereby a turning movement of the stem imparts both rotary and longitudinal movement to the valve, and means limiting the turning movement of the valve.

2. A valve of the character described, comprising a casing, a partition in the casing constituting a valve seat and having a port therein, said partition having in one face a central socket and a circular groove, a segmental valve in the casing, a central stud on the valve located in the socket of the partition, a flange on the valve movable in the groove of the seat, and means for imparting a turning and longitudinal movement to the valve.

3. A valve of the character described, comprising a casing, a partition in the casing constituting a valve seat and having a port therein, said partition having in one face a central socket and a circular groove, a segmental valve in the casing, a central stud on the valve located in the socket of the partition, a flange on the valve movable in the groove of the seat, a stem on the valve having screw threaded engagement with the valve casing, and a handle on the stem, whereby a turning movement of the valve imparts a longitudinal movement as well.

4. A valve of the character described, comprising a casing, a partition in the casing constituting a valve seat and having a port therein, said partition having in one face a central socket and a circular groove, a segmental valve in the casing, a central stud on the valve located in the socket of the partition, a flange on the valve movable in the groove of the seat, a stem on the valve having screw threaded engagement with the valve casing, a handle on the stem, whereby a turning movement of the valve imparts a longitudinal movement as well, and pins on the casing and stem permitting but a half turn to be imparted to the stem and valve.

5. A valve of the character described, comprising a casing, a partition in the casing constituting a valve seat and having a port therein, said partition having in one face a central socket and a circular groove, said casing having an internally screw threaded end, a segmental valve in the casing, a central stud on the valve located in the socket of the partition, a flange on the valve movable in the groove of the seat and the partition, a stem on the valve, an enlarged externally screw threaded end on the stem engaging the threads of the casing, a handle on the outer end of the stem, and means on the stem and casing permitting but a half turn of the valve.

ARTHUR E. ROPE.